3,323,531
QUICK OPENING GATE VALVE
Edsel A. Spellman, Abingdon, Md., assignor to the United States of America as represented by the Secretary of the Army
Filed Aug. 11, 1964, Ser. No. 388,965
5 Claims. (Cl. 137—68)

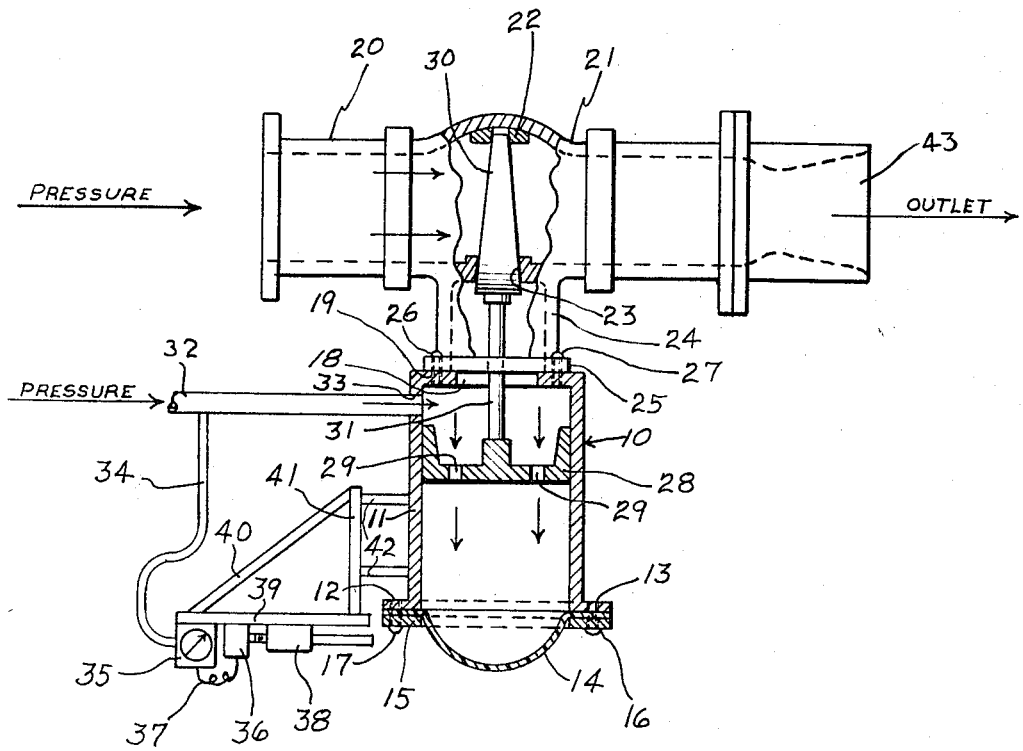

The invention described herein may be manufactured and used by or for the Government for governmental purposes, without the payment to me of any royalty thereon.

My invention relates to a quick opening gate valve for use in a rocket blast simulator or the like.

In shoulder launched rocket firing, the human is subject to a rocket blast. What effect this blast has on human behavior is not presently known. In order to determine the effect of the blast, a rocket blast simulator was designed.

In order to obtain the needed impulse to which the operator is subjected, a quick opening device was required. Many types of quick opening valves are on the market, but there are not any which would open in 10 mil secs. in the size needed. A diaphragm type valve has a very fast response time but since the operator will be subjected to the main blast, a diaphragm cannot be installed in the blast line as diaphragms, when exploded, expel fragments which create a safety hazard.

It is therefore a primary object of my invention to provide a quick opening gate valve for use in a rocket blast simulator which will open in 10 mil secs. and will not present a physical hazard to the operator.

Another object of my invention is to provide a diaphragm quick opening gate valve for use in a rocket blast simulator which is installed outside of the blast line.

A further object of my invention is to provide a diaphragm quick opening gate valve for use in a rocket blast simulator in which the blast parameters can be varied through fairly wide limits.

Other objects and advantages of my invention will be apparent during the course of the following description.

In the accompanying drawing forming a part of this application there is shown a side elevational sectional view of my invention attached to the main line of a rocket blast simulator.

In the drawing wherein, for the purpose of illustration, is shown a preferred embodiment of my invention, the numeral 10 indicates the diaphragm quick opening valve generally which comprises a circular piston housing 11 having an outwardly projecting flange 12 at its lower end providing a plurality of threaded openings 13 therethrough. A rupturable diaphragm 14 covers the flange 12 to close the lower end of the housing 11. The diaphragm 14 is held in position by a ring 15 having a plurality of openings 16 registering with the openings 13 of the flange 12 and the bolts 17 which extend through the openings 13 and 16. The upper end of the housing 11 has an elongated slot 18 for a purpose to be set forth hereinafter, and a plurality of openings 19.

The blast line 20 of the rocket blast simulator includes a T-pipe fitting 21 having a seat 22 in its inner upper portion and a tapered elongated slot 23 in its lower portion. The stem 24 of the T-pipe fitting 21 is provided with a collar 25 having a plurality of openings 26 extending therethrough and registering with the openings 19 in the housing 11. The housing 11 is secured to the collar 25 by bolts 27.

A piston 28 having openings 29 therein is movable within the housing 11. A gate valve 30 is tapered longitudinally so as to rest in the seat 22 at its uppermost portion and to close the tapered elongated slot 23 at its lower portion. The gate valve 30 has a stem 31 which is functionally integral with the piston 28. An inlet pipe 32 extends through a hole 33 in the housing 11.

A bleed line 34 extends from the inlet pipe 32 to an adjustable pressure gauge 35 which is connected to a solenoid 36 by the wire 37. When the pressure reaches a predetermined level the solenoid 36 triggers a gun 38 to rupture the diaphragm 14. The gun 38, solenoid 36, and gauge 35 are carried by the platform 39 having supporting arms 40 and 41. Brackets 42 secure the platform 39 to the piston housing 11.

In operation, air pressure from a suitable source is built up in the blast line 20 against the face of the gate valve 30. Air under pressure is also admitted separately through the inlet pipe 32 into the housing 11 and a portion thereof passes through the openings 29 of the piston 28 to equalize the pressure on opposite sides of the piston 28 and hold it in place. After the desired pressure is reached in the blast line 20, the diaphragm 14 is ruptured by a bullet from the gun 38 and the piston 28 and gate valve 30 are forced through the opening 18 and out of the housing 11 at a high rate of speed. Since the gate valve 30 opens at a high rate of speed, the pressure in the blast line 20 is released through the nozzle 43, or any convenient opening, and very little pressure is lost through the piston housing 11. This is the blast to which the operator is subjected. The piston 28 and gate valve 30 may be trapped after leaving the housing 11 and the ruptured diaphragm 14 by any suitable means.

After the piston 28 and gate valve 30 have been retrieved, they are again positioned in the housing 11 and a new diaphragm is secured between the flange 12 and the ring 15. The device is then ready for use again.

It is to be understood that the form of the invention herewith shown and described is to be taken as a preferred embodiment of same, and that various changes in the shape, size, and arrangement of parts may be resorted to without departing from the spirit of my invention or the scope of the subjoined claims.

I claim:

1. A quick opening valve for use in a rocket blast simulator having a blast line, comprising a piston housing secured outside of the blast line, said housing having an open bottom portion and a top portion communicating with the blast line having an elongated slot therein, a piston slidably movable in said housing, a gate valve secured to said piston extending through said slot and into the blast line to close same, said gate valve being of a size and configuration to enable it to pass freely through said elongated slot and said housing, a rupturable diaphragm closing the bottom portion of said housing, means for rupturing said diaphragm, and means supplying pressure within said piston housing on opposite sides of the piston to eject said gate valve and piston from said housing when said diaphragm is ruptured.

2. A quick opening valve for use in a rocket blast simulator having a blast line with a T-pipe fitting therein comprising a piston housing secured to said T-fitting outside of the blast line, said housing having an open bottom portion and a top portion communicating with the blast line having an elongated slot therein, a piston slidably movable in said housing, a gate valve in said blast line to close same of a size and configuration to enable it to pass freely through said elongated slot and said housing, a stem securing said gate valve to said piston, a rupturable diaphragm closing the bottom portion of said housing, a removable retaining ring holding said diaphragm in place, means for rupturing said diaphragm, and means supplying pressure on opposite sides of said piston to eject said gate valve and piston from said housing when said diaphragm is ruptured.

3. A quick opening valve for use in a rocket blast simulator having a blast line comprising a piston housing secured outside of the blast line, said housing having an open bottom portion and a top portion communicating with the blast line having an elongated slot therein, a piston having at least one opening therethrough slidably movable in said housing, a gate valve secured to said piston extending through said slot and into the blast line to close same, said gate valve being of a size and configuration to enable it to pass freely through said elongated slot and said housing, a rupturable diaphragm closing the bottom portion of said housing, means for rupturing said diaphragm, an inlet pipe extending into said housing, and means supplying pressure through said inlet pipe into said housing and through the opening in the piston to equalize the pressure in the housing on opposite sides of the piston to hold the gate valve in a closed position and to eject said gate valve and piston from said housing when said diaphragm is ruptured.

4. A quick opening valve for use in a rocket blast simulator having a blast line with a T-pipe fitting therein comprising a piston housing secured to said T-fitting outside of the blast line, said housing having an open bottom portion and a top portion communicating with the blast line having an elongated slot therein, a piston having at least one opening therethrough slidably movable in said housing, a gate valve in said blast line to close same and being of a size and configuration to enable it to pass freely through said elongated slot and said housing, a stem securing said gate valve to said piston, a rupturable diaphragm closing the bottom portion of said housing, means for rupturing said diaphragm, a removable retaining ring holding said diaphragm in place, an inlet pipe extending into said housing, and means supplying air pressure through said inlet pipe into said housing and through the opening in said piston to equalize the pressure in the housing on opposite sides of the piston to hold the gate valve in a closed position and to eject said gate valve and piston from said housing when said diaphragm is ruptured.

5. A quick opening valve for use in a rocket blast simulator having a blast line with a T-pipe fitting therein comprising a piston housing secured to said T-fitting outside of the blast line, said housing having an open bottom portion and a top portion communicating with the blast line having an elongated slot therein, a piston having openings therethrough slidably movable in said housing, a gate valve in said blast line to close same and being of a size and configuration to enable it to pass freely through said elongated slot and said housing, a stem securing said gate valve to said piston, a rupturable diaphragm closing the bottom portion of said housing, means for rupturing said diaphragm, a removable retaining ring holding said diaphragm in place, an inlet pipe extending into said housing, means supplying air pressure into the blast line against the face of said gate valve, and means supplying air pressure through said inlet pipe into said housing and through the openings in said piston to equalize the pressure in the housing on opposite sides of the piston to hold the gate valve in a closed position and to open said gate valve and eject same and said piston from said housing thereby permitting a sudden blast of air to pass through the blast line when said diaphragm is ruptured.

References Cited

UNITED STATES PATENTS

| 880,030 | 2/1908 | Leavitt | 137—68 X |
| 2,638,124 | 5/1953 | Nickerson | 251—327 X |
| 2,707,479 | 5/1955 | Thomann et al. | 137—70 |

WILLIAM F. O'DEA, *Primary Examiner.*

R. GERARD, *Assistant Examiner.*